Figure 1:
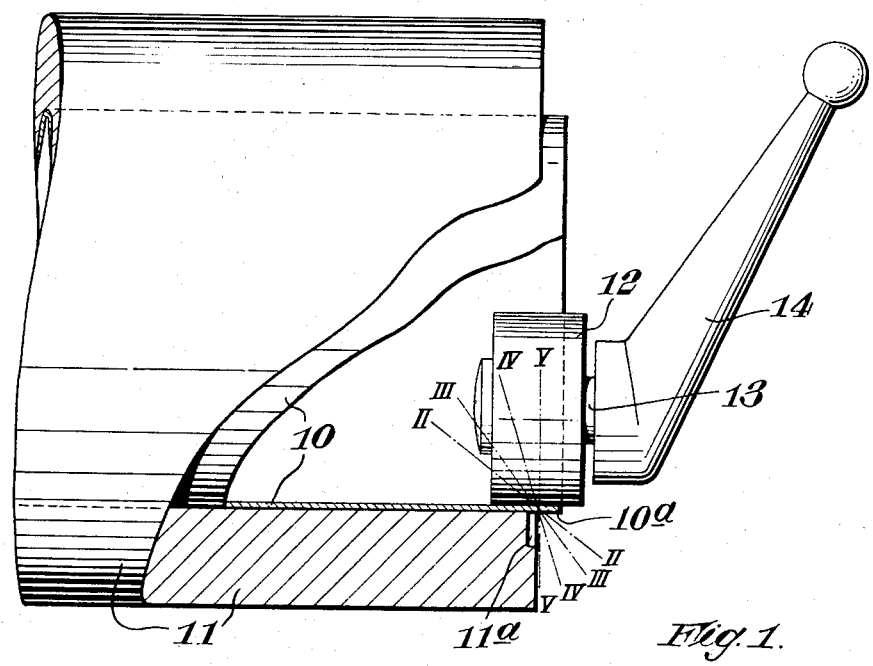
Figures 2, 3, 4, 5:
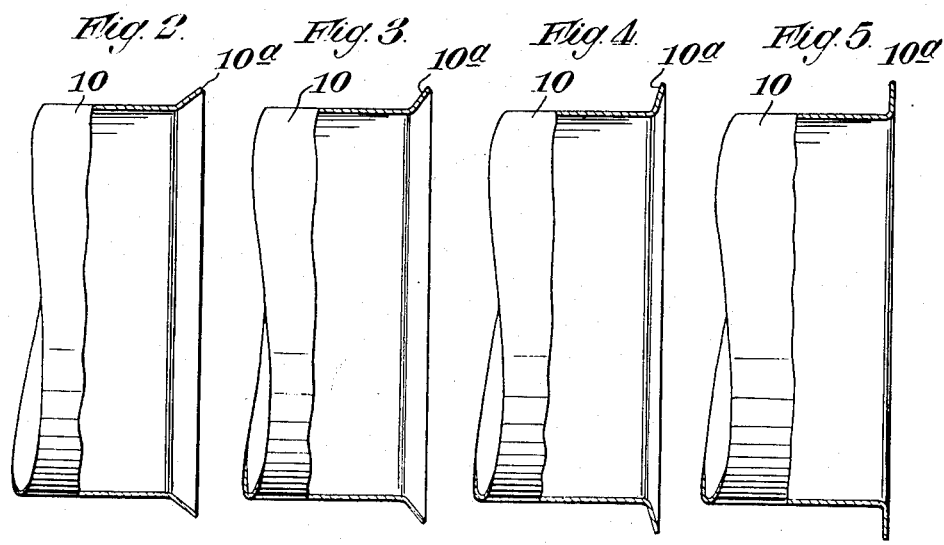

July 27, 1965 S. HEDGECOCK ETAL 3,196,655
LINERS OR SLEEVES FOR ENGINE CYLINDERS AND THE LIKE
Filed Sept. 14, 1962

United States Patent Office 3,196,655
Patented July 27, 1965

3,196,655
LINERS OR SLEEVES FOR ENGINE CYLINDERS AND THE LIKE
Stanley Hedgecock, deceased, late of Wolverhampton, England, by Vivien Janet Hedgecock and John Hedgecock, executors, both of Wolverhampton, England, assignors to Laystall Engineering Company Limited, London, England, a company of Great Britain
Filed Sept. 14, 1962, Ser. No. 257,354
3 Claims. (Cl. 72—101)

The present invention concerns liners or sleeves for engine cylinders and the like, which are replaceable or renewable elements owing to wear which occurs. In general, such liners have thick walls, this being necessary because an essential part of a liner is an end lip or flange which must be provided to serve as a locating member in relation to a surface of a body such as an engine block, into which the liner is fitted.

The wall thickness has in some instances, an important bearing on the suitability or otherwise of a liner. For example, heat is dissipated more quickly if the wall is thin, and where, in an engine block it is necessary to provide a much oversize bore, this may not be possible if the liner wall has to be thick, as the outside diameter of same is determined by the casting and cannot be varied.

The general method of manufacturing a liner or sleeve is to machine the outer surface, thereby to remove metal so as to leave a flange at one end. This method cannot be used practically to form a thin walled liner, owing to manufacturing difficulties and also to the fact that a lip or flange must be formed of a size which due to the wastage of metal, would be uneconomical.

It is an object of the present invention to provide a method of manufacturing a thin walled liner sleeve with a flange or lip at one end, which method results in the formation of the flange or lip of adequate extension or outside dimension, and without deformation or damage to the liner. A further object is to provide a thin walled flanged liner in which the outer diameter is fully finished and undistorted.

According to the present invention, there is provided a method of forming a flange at an end of a metal cylindrical sleeve, which method consists in mounting and retaining the sleeve within a collet or hollow chuck or similar holder with a part of the sleeve projecting therefrom, and in progressively turing the projecting part outwardly with respect to the sleeve axis by applying pressure on to the inner surface of the projecting part by a roller member, and by rotating said sleeve relatively to the roller member about the sleeve axis, and at the same time turning the said roller member through a path such that the projecting part is out-flared to form the flange with the metal of the sleeve flowing outwardly over the end of the holder.

Conveniently the sleeve is rotated on its axis, and the roller is set up so that its surface initially is parallel with said axis, the roller axis being mounted to turn whereby the surface of same can be moved progressively from the initial position into a final position in which said surface is at a right angle to the sleeve axis.

It will be seen that the member at the commencement bears on the inner sleeve surface projecting part which is parallel with the sleeve axis, and at the finish of the operation, the roller still bears on said surface, but now said projecting part has been turned through a right angle and is located in such position by a suitable end surface of the holder. The end of the holder may be recessed to receive the flange.

It is a further feature of the invention that the roller axis is set so as to be capable of movement towards and away from the sleeve surface. Thus the roller axis can be eccentrically mounted, thereby enabling the roller to be moved bodily during the forming of the flange. In this way, the radius of turning can be reduced as the out-flaring proceeds. It will be borne in mind that it is the undersurface of the flange which has to seat on to a cylinder block. Thus, the foller can be set up so that its surface is in alignment with the axis of turning of the roller, or said roller can be moved bodily to overhang or be set back from said axis. If at the commencement of out-flaring the roller surface is in alignment with the axis of turning of the roller, but is spaced from the cylinder surface, the eccentric mounting may be adjusted so as to move the roller towards and, if desired, into contact with the cylinder surface, and the roller surface can as the outflaring progresses, be set back a distance depending on the thickness of the sleeve wall.

A preferred form of tool for forming the flange is described and claimed in our co-pending application No. 257,355, now abandoned.

In order that a clear understanding of the invention may be obtained, reference will now be made to the accompanying diagrammatic drawings, illustrative of the method of forming a flange on a cylinder liner. In the drawings:

FIGURE 1 is a longitudinal section of the holder with the roller and sleeve in the initial position, and FIGURES 2–5 are fragmentary views of the sleeve end showing the progressive out-turning of the flange.

In the drawings, 10 is a thin walled sleeve which is first pressed or machined to the required outside diameter in any appropriate manner. The material thickness can be as small as 1 millimetre. Next, this sleeve is fitted into a hollow cylindrical chuck 11 in which the sleeve 10 must fit with accuracy to prevent deformation, this chuck being set up in a machine so as to be capable of turning on its axis. When set up, the end part 10a of about ¼" projects from the chuck, this amount projecting varying of course, in accordance with the required flange size. The holder or chuck 11 has a recess 11a in its end surface.

A tool is used to roll over the end part 10a and this comprises a roller 12 mounted for rotation on an axis 13 parallel with the longitudinal plane of the set up sleeve. The roller also is set up so as to be capable of turning with its axis through an angle or arc at a right angle to the sleeve axis as indicated by the arrowed line in FIGURE 1.

The roller is positioned so that its surface bears on the inner surface of the sleeve at the projecting end. Now, when the sleeve is rotating, the roller can be turned by means of a suitable operating handle such as the handle 14, so as to exert pressure on the end part in a direction such that said end part becomes out-splayed, the progressive turning causing this end part to out-flow and the splay increase gradually, until finally there is produced a lip which is in the plane of the cylinder end diameter, received in the recess 10a.

It will be understood that the axis on which the roller turns bodily is selected to obtain a gradual turning so that the grain flow of the material follows the contour of the section, thus ensuring adequate strength despite the thin section. Thus, the roller with its axis may turn on a line at a right angle to the sleeve radius, which line is positioned so that the required out-turned lip is formed. The movement may be truly angular, but the line of turning can itself move in relation to the sleeve as the out-turning progresses, to ensure a gradual flow, and in order to provide a firm flange or lip seat, it being borne in mind that it is the lower lip surface which is the locating surface. Final movement to effect pressure of the lip in the recess of the holder can be provided.

The roller can be mounted on an eccentric axis, and preferably is such that its surface at the point of contact with the sleeve end is initially on the line of the axis of turning of the roller, but as turning progresses, can be set back slightly from this axis, i.e. the radius of turning is progressively reduced.

The holder could be stationary, in which case the roller will also be arranged to turn in a circular path, and to be moved to provide the desired out-turning of the projecting end part.

In FIGURE 1, the lines II—II, III—III, IV—IV and V—V correspond with the position of the roller in FIGURES 2-5 respectively.

What is claimed is:

1. Method of manufacturing a cylinder liner, comprising the steps of mounting a metal cylindrical sleeve within rotatable sleeve holding means so that a part of the sleeve to be outflared projects therefrom, bringing an eccentrically mounted roller to bear on the inner surface of the projecting part, rotating the sleeve about its axis, turning said roller about an axis so that the projecting part is outflared to form a flange, and reducing the radius of turning of said roller, as the outflaring progresses until said flange is at right angle to the sleeve axis.

2. The method according to claim 1 wherein the roller's eccentric mounting is rotated so as to cause said reduction of the radius of turning of the roller.

3. The method according to claim 1 wherein said projecting part is outflared into a recess in said sleeve holding means.

References Cited by the Examiner

UNITED STATES PATENTS

| | | | |
|---|---|---|---|
| 782,004 | 2/05 | Chandler | 153—81 |
| 2,128,614 | 8/38 | Kobayashi | 113—52 |
| 2,159,185 | 5/39 | Smith | 153—81 |
| 2,408,596 | 10/46 | Bednar et al. | 113—81 |
| 2,840,136 | 6/58 | Bellarts | 153—81 |

FOREIGN PATENTS

| | | |
|---|---|---|
| 366,252 | 1/23 | Germany. |
| 706,615 | 5/41 | Germany. |

CHARLES W. LANHAM, *Primary Examiner.*

WILLIAM J. STEPHENSON, *Examiner.*